United States Patent [19]

Kim

[11] Patent Number: 5,760,845

[45] Date of Patent: Jun. 2, 1998

[54] METHOD FOR DETERMINING MOTION VECTORS BASED ON A BLOCK MATCHING MOTION ESTIMATION TECHNIQUE

[75] Inventor: Sang-Ho Kim, Seoul, Rep. of Korea

[73] Assignee: Daewoo Electronics Co., Ltd., Seoul, Rep. of Korea

[21] Appl. No.: 578,769

[22] Filed: Dec. 26, 1995

[30] Foreign Application Priority Data

Dec. 30, 1994 [KR] Rep. of Korea .................. 94-39975

[51] Int. Cl.$^6$ ............................................... H04N 7/18
[52] U.S. Cl. .......................... 348/699; 348/700; 348/416; 348/415
[58] Field of Search ............................ 348/699, 700, 348/416, 415, 411, 413

[56] References Cited

U.S. PATENT DOCUMENTS

| | | | |
|---|---|---|---|
| 5,151,784 | 9/1992 | Lavagetto et al. | 358/136 |
| 5,428,403 | 6/1995 | Andrew et al. | 348/699 |
| 5,561,475 | 10/1996 | Jung | 348/699 |
| 5,583,580 | 12/1996 | Jung | 348/699 |

*Primary Examiner*—Tommy P. Chin
*Attorney, Agent, or Firm*—Anderson Kill & Olick, P.C.

[57] ABSTRACT

A method for detecting motion vectors comprises the steps of (a) motion-estimating a search block with respect to each of the candidate blocks in a corresponding search region to produce displacement vectors and error functions corresponding thereto, each of the displacement vectors representing each of the displacements between pixels in the search block and their corresponding pixels in each of the candidate blocks, and the error functions being calculated based on differences between luminance levels of the pixels in the search block and those of their corresponding pixels in each of the candidate blocks, (b) calculating an error value based on each of the displacement vectors and each of the error functions corresponding thereto, and (c) choosing a minimum error value to define a displacement vector corresponding to the minimum error value as the motion vector for the search block.

4 Claims, 1 Drawing Sheet

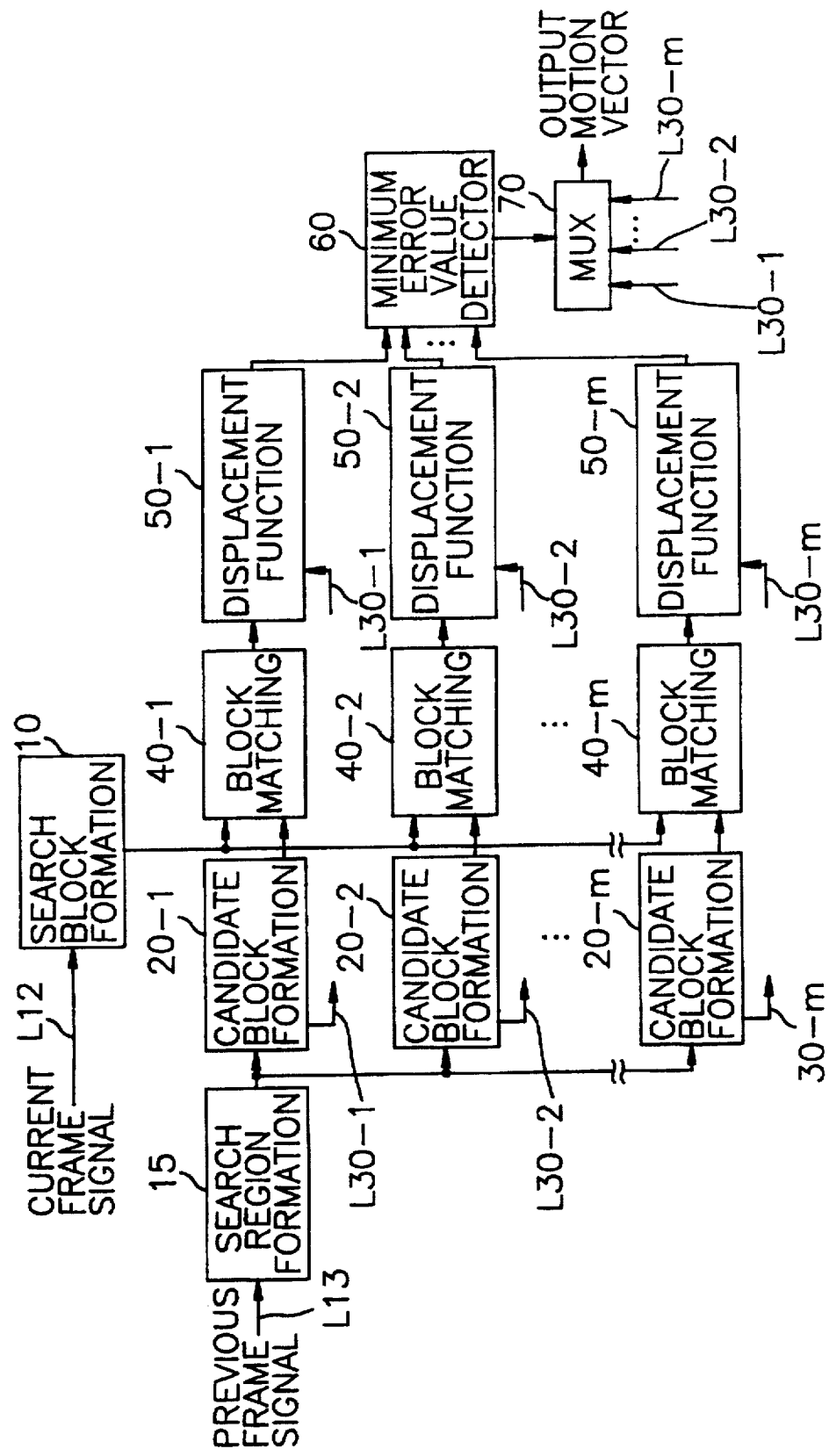

METHOD FOR DETERMINING MOTION VECTORS BASED ON A BLOCK MATCHING MOTION ESTIMATION TECHNIQUE

FIELD OF THE INVENTION

The present invention relates to a block matching motion estimation method for use in a video signal encoding; and, more particularly, to an improved block matching motion estimation method which is capable of improving a coding efficiency of video signal by taking into account the magnitude of a motion vector.

DESCRIPTION OF THE PRIOR ART

When an image signal comprising a sequence of image "frames" is expressed in a digital form, substantial amounts of data are generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data.

Among the various video compression techniques used, a motion compensated interframe coding technique, which utilizes temporal redundancies of video signals between two adjacent video frames, is known to be one of the most effective compression techniques.

In the motion compensated interframe coding technique, current frame data is predicted from previous frame data based on an estimation of the motion and differences between corresponding pixel data in the current and the previous frames. Such an estimated motion may be described in terms of two dimensional motion vectors representing displacements between the corresponding pixels in the previous and the current frames.

One of the motion vector estimation schemes which have been proposed in the art is a block matching algorithm, wherein a current frame is divided into a plurality of equal-sized search blocks, a typical size of each search block ranging between 8×8 and 32×32 pixels, and the previous frame is divided into a corresponding number of large search regions, each search region being further divided into a multiplicity of candidate blocks of an identical size with that of the search block.

To determine a motion vector for a search block in the current frame, a similarity calculation is performed between the search block of the current frame and each of a multiplicity of candidate blocks included in a corresponding search region within the previous frame. An error function such as a mean square error (MSE) function or a mean absolute error (MAE) function is used to carry out the similarity calculation between the search block of the current frame and each of the candidate blocks in the search region. The MSE and MAE functions may be expressed as follows:

$$MSE = \frac{1}{H \times V} \sum_{i=1}^{H} \sum_{j=1}^{V} (I(i,j) - P(i,j))^2 \quad \text{Eq. 1A}$$

$$MAE = \frac{1}{H \times V} \sum_{i=1}^{H} \sum_{j=1}^{V} |I(i,j) - P(i,j)| \quad \text{Eq. 1B}$$

wherein H×V represents the size of a search block; I(i,j) represents the luminance level of a pixel at a coordinate (i,j) in the search block; and P(i,j) represents the luminance level of a corresponding pixel at the coordinate (i,j) in a candidate block displaced by a displacement vector D(k,l), where k and l are the x and y components of the displacement vector.

And a motion vector in a conventional block matching algorithm is chosen as a displacement vector between the search block and a candidate block that minimizes the error function. The motion vector and an error signal which represents differences between the search block and the candidate block which yields the minimum error function are then encoded and transmitted to a receiver. The encoded data transmitted is used at the receiver to reconstruct the current frame from its previous frame on a block-by-block basis.

In the motion vector estimation schemes used in the art, however, a motion vector is determined based on the error function only, without a due regard paid to the magnitude of the motion vector itself, which is also encoded; and, accordingly, in case the motion vector is of a large magnitude, the resultant coding efficiency may be degraded.

SUMMARY OF THE INVENTION

It is, therefore, an object of the present invention to provide a motion estimation method which is capable of improving the coding efficiency of a video signal by taking into account the magnitude of a motion vector and an error function in determining the motion vector.

In accordance with the invention, there is provided a method for detecting motion vectors between a current frame and a previous frame of video signals by employing a block matching motion estimation technique, wherein the current frame is divided into a plurality of search blocks of an identical size and the previous frame is divided into a corresponding number of search regions, each search region being further divided into a multiplicity of candidate blocks of the identical size to that of the search block, which comprises the steps of:

(a) motion-estimating a search block with respect to each of the candidate blocks in a corresponding search region to produce displacement vectors and error functions corresponding thereto, each of the displacement vectors representing each of the displacements between pixels in the search block and their corresponding pixels in each of the candidate blocks, and the error functions being calculated based on differences between luminance levels of the pixels in the search block and those of their corresponding pixels in each of the candidate blocks;

(b) calculating an error value based on each of the displacement vectors and each of the error functions corresponding thereto; and (c) choosing a minimum error value to define a displacement vector corresponding to the minimum error value as the motion vector for the search block.

BRIEF DESCRIPTION OF THE DRAWING

The above and other objects and features of the present invention will become apparent from the following description of preferred embodiments given in conjunction with the accompanying drawing, which is a schematic block diagram of a block matching motion estimator in accordance with the invention.

DETAILED DESCRIPTION OF THE PREFERRED EMBODIMENTS

Referring to the drawing, there is shown a block diagram of a block matching motion estimator in accordance with the present invention.

A current frame signal is provided through a line 12 to a search block formation section 10 that divides the current frame into a plurality of search blocks of an identical size, each comprising H×V pixels, and provides pixel data of a current search block to block matching sections 40-1 to 40-m. Actually, pixel data of the search blocks is provided to the block matching sections on a block-by-block basis according to a predetermined sequence.

Meanwhile, the previous frame signal stored in a memory (not shown) is fed through a line 13 to a search region formation section 15 that divides the previous frame into as many search regions as the search blocks of the current frame, wherein each search region includes m number of candidate blocks of the identical size to that of the search block. Data of a search region corresponding to a current search block is applied to candidate block formation sections 20-1 to 20-m, wherein the m number of candidate blocks of H×V pixels are generated from the search region data. In the candidate block formation sections 20-1 to 20-m, each of relative displacement vectors D(k,l)'s between pixels in each of the candidate blocks in the search region and their corresponding pixels in the current search block is obtained and provided to each of corresponding displacement function sections 50-1 to 50-m and also to a multiplexer 70 through lines 30-1 to 30-m, respectively. Pixel data for each of the candidate blocks is provided from the candidate block formation sections 20-1 to 20-m to the corresponding block matching sections 40-1 to 40-m, respectively.

At each of the block matching sections 40-1 to 40-m, each of the error functions between the current search block and each of the candidate blocks of the search region is calculated by employing the MSE or MAE function in Eq. 1 and supplied to each of the corresponding displacement function sections 50-1 to 50-m, respectively, wherein each displacement function "DIS" is calculated from the displacement vector D(k,l) fed via lines 30-1 to 30-m as follows:

$$DIS(k,l)=(k^2+L^2)*\alpha \quad \text{Eq. 2}$$

or $$DIS(k,l)=(|k|+|l|)*\beta$$

wherein k and l are the x and y components of the displacement vector, respectively, and $\alpha$ or $\beta$ is a displacement function coefficient.

And then, each of the displacement function sections 50-1 to 50-m also generates an error value E based on the error function calculated in the block matching sections 40-1 to 40-m and the displacement function "DIS" as follows:

$$E(k,l) = \frac{1}{H \times V} \sum_{i=1}^{H} \sum_{j=1}^{V} (I(i,j) - P(i,j))^2 + (k^2 + l^2) * \alpha \quad \text{Eq. 3}$$

$$\text{or } E(k,l) = \frac{1}{H \times V} \sum_{i=1}^{H} \sum_{j=1}^{V} |I(i,j) - P(i,j)| + (|k| + |l|) * \beta$$

As can be seen from the above equation, the error value E depends explicitly on the displacement function as well as the error function. It should be noted that the displacement function coefficient $\alpha$ or $\beta$ may be adjusted depending on the portion of the motion vectors occupied in an encoded bit stream. That is, if the portion of the encoded bits corresponding to the motion vectors with respect to a total number of encoded bits is minimal, the displacement function coefficient $\alpha$ or $\beta$ can be adjusted to a small value; and, conversely, if the portion is of a significant value, then in order to reflect the extent of contribution of the motion vectors to the total number of encoded bits, it is preferable to increase the displacement coefficient $\alpha$ or $\beta$.

All the error values from the displacement function sections 50-1 to 50-m are supplied to a minimum error value detector 60, wherein all the error values are compared with each other and a smallest error value is selected to provide a selection signal, which indicates the candidate block corresponding to the minimum error value, to the multiplexer (MUX) 70.

In response to the selection signal, the MUX 70 chooses the displacement vector of the candidate block, which corresponds to the minimum error value, to provide it as the motion vector for the search block.

While the present invention has been shown and described with respect to the particular embodiments, it will be apparent to those skilled in the art that many changes and modifications may be made without departing from the spirit and scope of the invention as defined in the appended claims.

What is claimed is:

1. A method for detecting motion vectors between a current frame and a previous frame of video signals by employing a block matching motion estimation techniique, wherein the current frame is divided into a plurality of search blocks of an identical size and the previous frame is divided into a corresponding number of search regions, each search region being further divided into a multiplicity of candidate blocks of said identical size to that of a search block, which comprises the steps of:

(a) obtaining a displacement vector and an error function for each the candidate blocks in a corresponding search region of a search block, the displacement vector representing a displacement between the search block and each of the candidate blocks, and the error function being calculated based on differences between luminance levels of the pixels in the search block and those of their corresponding pixels in each of the candidate blocks;

(b) modifying the error function based on the displacement vector to provide a modified error value E for said each of the candidate blocks; and (c) choosing a minimum error value among the modified error values to define a displacement vector corresponding to the minimum error value as a motion vector for the search block.

2. The method according to claim 1, wherein
said error function is a mean square error (MSE) defined as:

$$MSE = \frac{1}{H \times V} \sum_{i=1}^{H} \sum_{j=1}^{V} (I(i,j) - P(i,j))^2$$

H×V being the size of the search block; I(i,j), a luminance level at a pixel coordinate (i,j) in the search block; and P(i,j), a luminance level at a corresponding pixel coordinate (i,j) in said each of the candidate blocks; and said error value E is calculated as:

$$E=MSE+(k^2+l^2)*\alpha$$

k and l being x and y components of the displacement vector, respectively; and $\alpha$, a displacement function coefficient.

3. The method according to claim 1, wherein
said error function is a mean absolute error (MAE) defined as:

$$MAE = \frac{1}{H \times V} \sum_{i=1}^{H} \sum_{j=1}^{V} |I(i,j) - P(i,j)|$$

H×V being the size of the search block; I(i,j), a luminance level at a pixel coordinate (i,j) in the search block; and P(i,j), a luminance level at a corresponding pixel coordinate (i,j) in said each of the candidate blocks; and said error value E is calculated as:

$$E = MAE + (|k| + |l|) * \beta$$

k and l being x and y components of the displacement vector, respectively; and β, a displacement function coefficient.

4. The method according to claim 1, further comprising, after said step (c) for choosing the minimum error value, the step of (d) repeating said steps (a) to (c) for the remaining search blocks in the current frame to thereby determine the motion vectors between the current frame and the previous frame.

\* \* \* \* \*